United States Patent [19]

Savit

[11] 4,066,993
[45] Jan. 3, 1978

[54] LIMITED-RANGE SEISMIC CONTROL SYSTEM

[75] Inventor: Carl H. Savit, Houston, Tex.

[73] Assignee: Western Geophysical Company of America, Houston, Tex.

[21] Appl. No.: 739,415

[22] Filed: Nov. 8, 1976

[51] Int. Cl.² ............................ G01V 1/22; G01V 1/02
[52] U.S. Cl. .............................. 340/15.5 TS; 340/17 R; 325/28; 179/82; 343/719
[58] Field of Search ...................... 340/15.5 TS, 17 R; 325/28; 179/82; 343/719, 723, 843; 181/107

[56] References Cited

U.S. PATENT DOCUMENTS

| 3,543,262 | 11/1970 | Hutton | 179/82 |
|---|---|---|---|
| 3,585,505 | 6/1971 | Ogilvy | 325/28 |
| 3,735,265 | 5/1973 | Karaganis | 325/28 |
| 3,760,278 | 9/1973 | Narbaits-Jaureguy et al. | 325/28 |
| 3,896,380 | 7/1975 | Martin | 325/28 |
| 3,900,825 | 8/1975 | Hinnant | 340/15.5 TS |
| 4,012,662 | 3/1977 | Martin | 325/28 |

Primary Examiner—Howard A. Birmiel
Attorney, Agent, or Firm—William A. Knox

[57] ABSTRACT

A seismic exploration system includes a recording vehicle having a seismic cable connected thereto and one or more vibrator units. The seismic sensor cable includes at least one unterminated conductor. Operation of the vibrator units is programmed by transmitting, at very low frequency (VLF), a frequency-modulated, coded control-signal from the recording vehicle into the unterminated conductor. The conductor, acting as a VLF antenna, radiates a weak electrostatic E-field. A ferrite-core loop antenna on the vibrator unit detects the coded control signal, thereby to initiate the required vibrator operation. If desired, a reproduction of the seismic signal generated by the vibrator can be transmitted back to the recording truck over the same VLF radio link.

26 Claims, 4 Drawing Figures

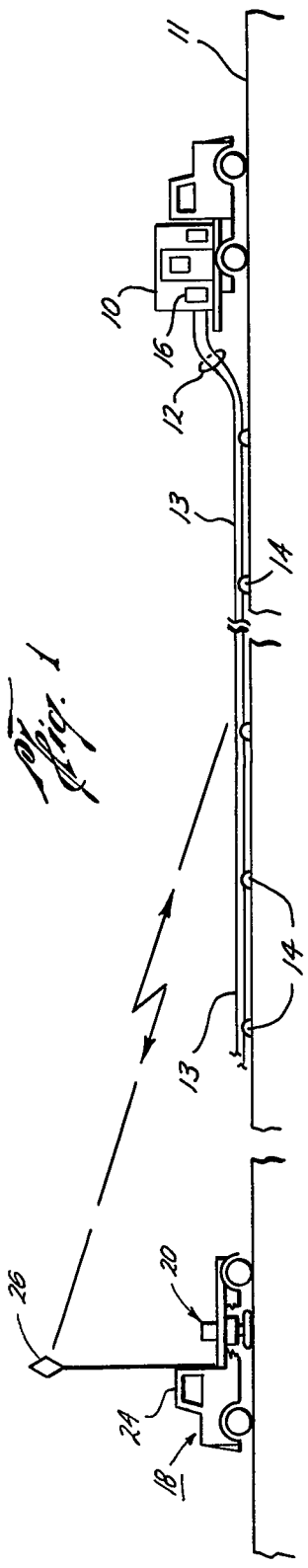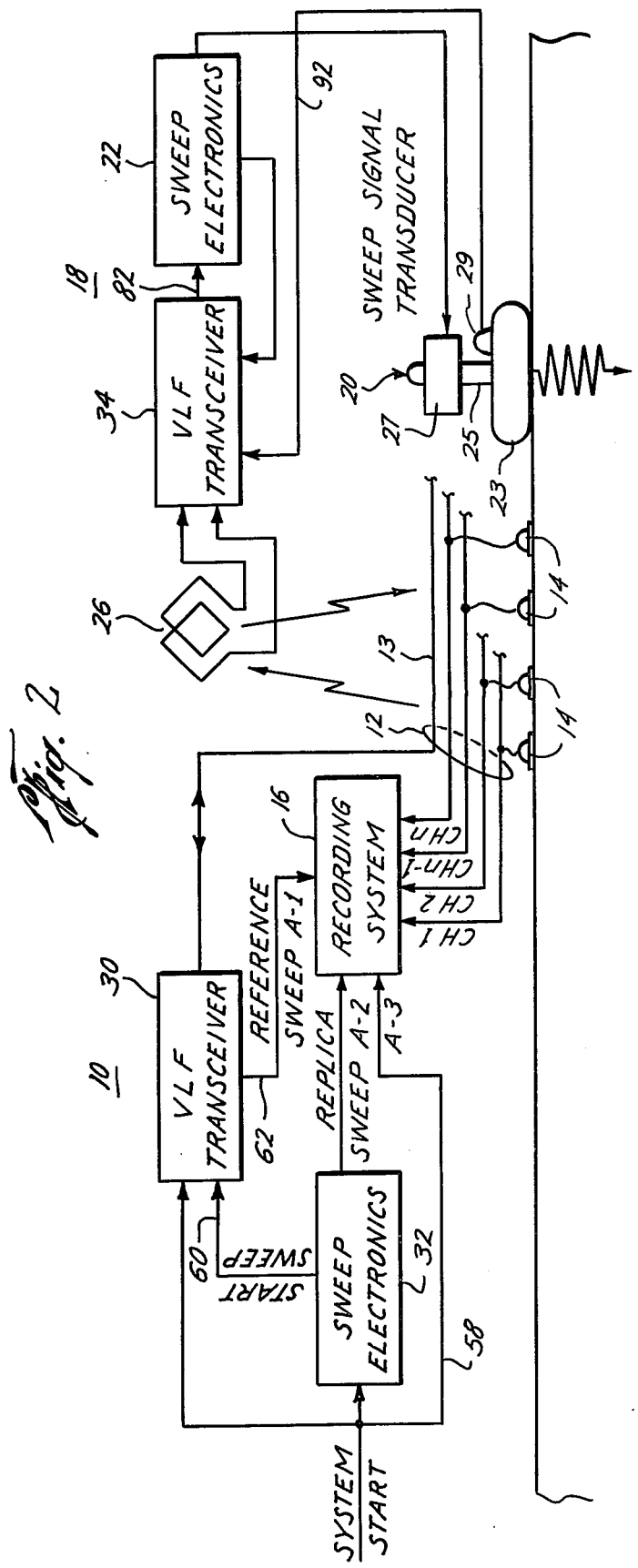

1

LIMITED-RANGE SEISMIC CONTROL SYSTEM

BACKGROUND OF THE INVENTION

1. Field of the Invention

This invention relates to the control of the operation of a seismic signal transducer by wireless trnsmission of a coded signal.

2. Description of the Prior Art

In one method of seismic exploration, one or more mobile vibratory-type seismic signal transducers inject a sweep signal into the ground. A plurality of seismic sensors, connected to a recording vehicle through a multiconductor cable, detect the sweep signals after they have been reflected from subsurface earth layers. The detected signals are transmitted to the recording vehicle through the multiconductor cable.

In a typical operation, several hundred sensors are laid out along a segment of the line of survey. The line segment or "spread" may extend for 2 or 3 miles. The recordng vehicle, to which the sensors are connected through the multiconductor cable, is positioned at a convenient location along the spread. One or more mobile seismic signal transducer units such as vibrators proceed along the spread, stopping at selected stations to transmit a seismic signal into the ground. Commonly, the spacing between stations is 200-300 feet. Each station is occupied by the moble units for about 10-20 seconds. Although the line of station locations parallels the line of survey, terrain conditions and obstructions occasionally force the mobile units to detour some distance away from the actual seismic sensor spread.

In operation, the recording truck issues a START-SWEEP command to the mobile units to generate a sweep and, at the same time, activates the recording system to record the reflected signals detected by the seismic sensors. An accelerometer is attached to the vibrating transducer on the mobile unit to record the sweep signal actually injected into the ground. Upon command it transmits this data back to the recording truck as a reference sweep for verification that the correct sweep was in fact generated.

The START-SWEEP command and the reference sweep could be directly transmitted between the mobile units and the recording truck by wire land line, such as through the multiconductor cable. Such a procedure is impractical, however, since a physical wire-connection between the mobile units and the cable would have to be made at every station. Because the mobile units linger but a few tens of seconds at each station, there is no time to make a physical wired connection to the recording vehicle. Accordingly, the signals are customarily transmitted between recording truck and mobile units by a VHF radio link.

The START-SWEEP radio command is a 128-millisecond burst of coded bits, transmitted as an FM signal over the VHF channel. The returned reference sweep signal, of some 15 seconds duration, is a sub-carrier FM signal transmitted over the same channel. Over a communications channel, the START-SWEEP command sounds like a harsh "zip." The reference sweep signal is heard as a chirp signal of rising or falling pitch. In an actual seismic operation, these signals are transmitted every 20-30 seconds.

The number of VHF channels allotted to the petroleum industry in general is limited; to geophysical field crews, only one or two such channels are available In a high-traffic area, voice communications are virtually impossible over a channel that is also used for vibrator operations. An alternate radio link between recorder and mobile units that will not interfere with normal voice traffic is therefore highly desirable.

SUMMARY OF THE INVENTION

It is an object of this invention to provide a limited-range radio link between a master an a slave station that will be clear of normal communication channels and that will not require licensing by governmental agencies.

It is a further object of this invention to transmit seismic data by frequency-modulating a carrier that lies within or just above the audio-frequency band.

In accordance with one aspect of the invention, a vibratory-type seismic system, including a recorder, a seismic cable and a vibrator-type seismic source, are provided with short-range electromagnetic signal transmission facilities between the recording vehicle and the vibrator vehicle, both for initiating a seismic impulse, and also for recording the exact form of the impulse as it is transmitted. An additional feature of the invention involves the use of an elongated antenna, extending for at least most of the length of said seismic cable, to facilitate short range communication between the recoring vehicle and the mobile seismic source vehicle.

In accordance with a feature of this invention, the center frequency of the carrier is above the frequency of normal seismic signals. A preferred frequency is 20 kHz (20000 cycles per second).

In accordance with another aspect of this invention, a frequency-modulated, VLF signal is transmitted from a recording truck (master-station) into an unterminated wire in a long multiconductor cable. The unterminated wire acts as an E-field radiator to transmit commands to the mobile units, each of which is equipped with a VLF antenna. A sweep-signal replia may be transmitted from the VLF antennas on the mobile units back to the recording truck through the unterminated wire.

In accordance with another feature of this invention, the unterminated wire which serves as an antenna may be approximately one-quarter wavelength long at the operating radio frequency.

In a preferred embodiment of this invention, the radiated power is substantially less than 100 milliwatts.

BRIEF DESCRIPTION OF THE DRAWINGS

FIG. 1 shows the mode of deploying the seismic equipment in accordance with one embodiment of this invention;

FIG. 2 is a block diagram of the principal components of the system shown in FIG. 1;

DETAILED DESCRIPTION of the INVENTION

Figure 3:
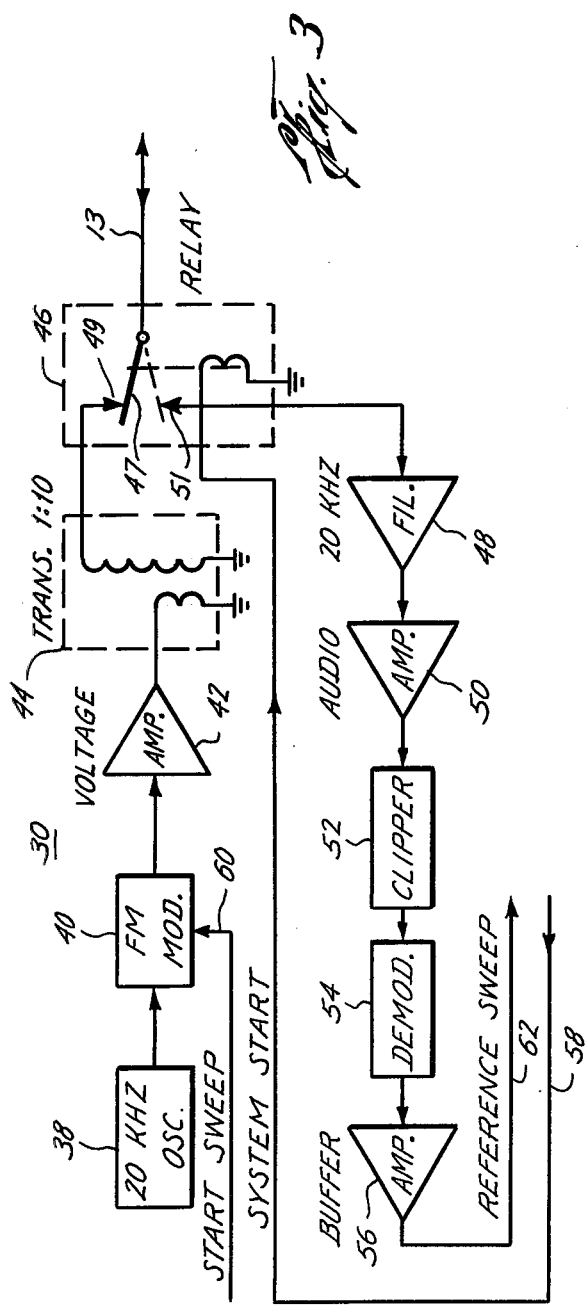
FIG. 3 is a schematic block diagram of a VLF transceiver as used in a recording vehicle.

In FIG. 1, a long multiconductor cable 12 placed on the ground 11, is connected to a recording vehicle 10. Cable 12 includes a large number of conductor pairs (not showm), such as 50 pairs. In addition, cable 12 includes a single conductor 13, extending the entire length of the cable. Conductor 13 is unterminated (i.e., is floating) at the cable end most remote from vehicle 10. At selected intervals along cable 12, which may be two or three miles long, there are placed a number of seismic sensors or sensor arrays 14. In accordance with well-known techniques, each sensor or sensor array is connected to a separate conductor pair in cable 12.

Referring now to FIGS. 1 and 2, a multichannel recording system 16 of any well-known type having, for example, fifty data channels, is mounted in recording vehicle 10. In accordance with conventional practice, each conductor pair of cable 12, is coupled to a separate data-recording channel in recording system 16. In addition to the data channels Ch1, Ch2, CH(n-1), Ch(n), two or more auxiliary-data recording channels A1, A2, etc., may be included in recording system 16. Recording truck 10 contains a VLF transceiver 30 and a sweep generator electronics package 32, both of which will be described later.

One or more mobile, seismic acoustic-signal generator units 18, are located at some predesignated station along cable 12, but remotely with respect to recording vehicle 10. The mobile unit 18 may be a vibrator buggy such as described in U.S. Pat. No. 3,905,446 for a Self-Propelled Seismic Signal Generator, assigned to the assignee of this patent application. Insofar as this disclosure is concerned, mobile unit 18 includes a hydraulic sweep-signal transducer 20 whose operation is programmed by a sweep signal electronics package 22 installed inside cab 24 of mobile unit 18.

In vibrator-type sources, a vehicle such as a buggy supports a large, heavy, substantially horizontal base plate 23 that is connected by a vertical shaft 25 to an inertia mass 27 which together make up sweep-signal transducer 20. The base plate is raised as the buggy moves from one seismic station to another, but is firmly pressed against the ground to support at least a portion of the weight of the buggy prior to energization of the base plate. A hydraulic linear actuator (not shown) driven by the sweep electronics 22 causes the base plate to move in reciprocating motion along a vertical axis against the reaction of the inertia mass. The base plate injects a swept-frequency vibratory signal train or "sweep" into the ground that lasts for several seconds (a "sweep cycle"). The frequency of the vibratory signal may be varied continuously throughout the sweep cycle, for example from 5 to 80 Hertz. Operation of sweep-signal electronics 22 is initiated by START-SWEEP command transmitted from VLF transceiver 30 in recording vehicle 10 to a VLF transceiver 34 in mobile unit 18.

Mounted on base plate 23 of sweep-signal transducer 20, is a strong-motion detector 29, such as an accelerometer. Detector 29 senses the motion of base plate 23 as an electrical signal. The detected signal is transmitted via VLF transceiver 34 from mobile unit 18 to recording vehicle 10 where the signal is received by VLF transceiver 30 and recorded on auxiliary chennel A1 as a reference sweep.

Sweep-signal electronics packages 32, mounted in recording vebicle 10, and 22 mounted in mobile unit 18 are programmed identically. They are available commercially from Pelton Co. of Ponca City, Ok. and are described in U.S. Pat. Nos. 3,881,167, 3,854,118, and 3,739,870. In operation, a SYSTEM-START pulse is actuated by the recording technician in recording vehicle 10. The SYSTEM-START signal is generated by a simple switch-closure, such as by a manual push button switch. The SYSTEM-START signal arms the recording system 16, switches the VLF transceiver 30 to transmit mode, and arms sweep electronics 32. The operator of mobile unit 18 had previously manually armed his own sweep electronics 22, and the VLF transceiver 34 to the receive mode. Upon receipt of the SYSTEM-START pulse, sweep electronics 32 sends the 128-ms, coded START-SWEEP command to VLF transceiver 30 whence it is transmitted into floating conductor 13, which is connected to the output of transceiver 30. Floating conductor 13 acts as a weak E-field radiator having a transmission range of 200 or 300 yards. The START-SWEEP signal is received by antenna 26 connected to VLF transceiver 34 in moble unit 18. The signal is decoded by sweep electronics 22. Upon completion of transmission of the START-SWEEP signal, sweep electronics 32 sends a replica sweep signal to recording system 16 where the replica sweep is recorded on auxiliary channel A2. Simultaneously, sweep electronics 22 in the mobile buggy causes sweep-signal transducer 20 to inject the same desired sweep signal into the ground.

At the same instant that sweep-signal electronics 22 and 32 begin the sweep, VLF tranceiver 34 is switched from "transmit" to "receive" and transceiver 34 is switched from the receive mode to the transmit mode. The two transceivers having switched functions, the reference sweep from detector 29 can now be transmitted from moble unit 18 to recording vehicle 10 for recording on auxiliary channel A1 as a reference sweep. Comparison of replica and reference sweeps, after allowing for slight transmission delays, will verify that the correct sweep was indeed injected into the ground.

FIG. 3 illustrates in block form, the principal components of transceiver 30 in recording unit 10. The transmitter section includes 20-kHz oscillator 38, FM modulator 40, voltage amplifier 42, an output step-up transformer 44 having a 1:10 turns ratio, and control relay 46. The receiving section includes a portion of relay 46, bandpass filter 48, audio amplifier 50, clipper 52, FM detector-demodulator 54 and buffer amplifier 56. All of the enumerated components are conventional and, per se, from no part of this invention. Accordingly, only their functional relationship, with respect to the system of this invention, will be discussed.

To initiate operations, as previously outlined, the operator issues a "SYSTEM START" command which may simply be a push button closure to provide a pulse over SYSTEM START bus 58 to turn on the recording equipment 16, to energize sweep electronics 32 and to close the contacts of relay 46 to the position shown in FIG. 3. Thereafter, the sweep electronics issues the coded START-SWEEP signal over START-SWEEP bus 60 to FM modulator 40, where the 20 kHz carrier is appropriately frequency-modulated by the command signal in accordance with well-known techniques. With a center frequency of 20 kHz, a frequency deviation of about ±3 kHz may be employed. The output of modulator 40 is amplified to a level of about 20 volts in voltage amplifier 42 and is stepped up to about 200 volts in the 1:10 transformer 44. From transformer 44, the FM signal passes through relay contacts 47, 49 to floating conductor 13 contained within the multiconductor cable 12. Since floating conductor 13 is unterminated at one end, it draws virtually no power except that due to shunt capacitance and inductance. The power except that due to shunt capacitance and inductance. The total power is only a few tens of milliwatts. The signal charges the unterminated wire 13 capacitatively to form a weak electrostatic E-field which extends for a few hundred yards from the cable.

In a preferred embodiment, the VLF center frequency is 20 kHz, but frequencies in the range of 15 to 25 kHz, have been determined to be the most efficient in common use. One factor in the actual choice of center frequency is related to the length of a typical seismic spead which also determines the length of floating conductor 13. Although in electrostatic radiation there should be no loading effect, the shunt capacitance and inductance associated with a long wire will, in fact, create a very small amount of loading. Accordingly, it is desirable that the length of floating conductor 13 be on the order of approximately a quarter wave length of the radiated energy. Assuming a propagation velocity for electrical signals through the floating conductor of about 1.4 nanoseconds ($10^{-9}$ second) per foot, and a center frequency of about 20 kHz, the wavelength of the radiated energy is about 6.7 miles, giving a quarter wavelength of about 1.7 miles. Assuming a commonlyused spread length of about 10,000 feet (1.9 miles), the length of floating conductor 13 approximates the desired one-quarter wavelength. Of course other combinations of center frequency and spread lengths can be employed at a relatively minor loss in efficiency.

As stated above, the transmission range of the VLF radio signal is very short, on the order of 200 to 300 yards. But because mobile unit 18 is always within a few hundred feed laterally of cable 12 and the associated floating conductor 13, its antenna 26 will usually be within reception and transmission range of the floating conductor in the cable regardless of its actual linear distance along the cable from recording unit 10. Thus, although the mobile unit 18 may be two or three miles from recording vehicle 10, it is still within the range, laterally, of the long-wire radiator formed by floating conductor 13.

Following the SYSTEM-START, signal transmission of the 128-ms START-SWEEP code causes sweep electronics 32 in recording unit 10 and sweep electronics 22 in mobile unit 18 to generate sweeps substantially simultaneously. Once the START-SWEEP command has been transmitted, relay 46 is deactivated, closing movable contact 47 against contact 51 (dotted line). Transceiver 30 is now armed to receive reference sweep signal from the mobile unit. In the recording unit 10, the sweep locally generated by electronics 32 is recorded by recording equipment 16 as the replica sweep on auxiliary channel A2. From mobile unit 18, the signal generated by detector 29 is transmitted back to recording unit 10 as a reference sweep. The reference sweep signal is received over floating conductor 13 where it passes through relay 46 to the receiving portion of transceiver 30. Here, the signal is filtered, amplified, demodulated and transmitted to the recording system 16 by buffer amplifier 56 over bus 62 to auxiliary channel A1.

Figure 4:
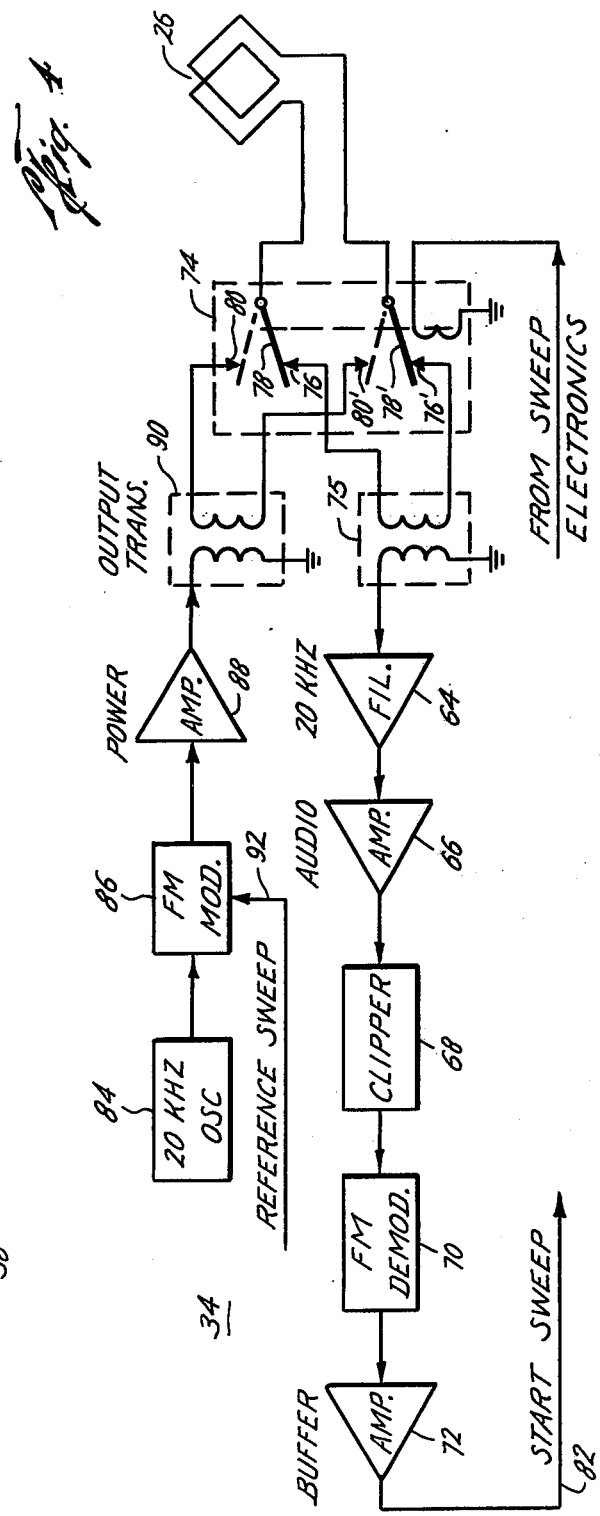
FIG. 4 is a block diagram of the VLF transceiver as used in the mobile vibrator unit.

The circuit block included in transceiver 34 is mobile unit 18 is shown in FIG. 4. The receiving portion of transceiver 34 is similar in all respects to the corresponding portion of transceiver 30 in recording unit 10, including filter 64, amplifier 66, clipper 68, demodulator 70 and buffer amplifier 72.

Double pole, double throw relay 74 interconnects antenna 26 with receiver input transformer 75 by contacts 76, 76' through arms 78, 78'. In the idle state, the relay contacts are set as shown by the solid line since the receiver is awaiting a START-SWEEP command. When a START-SWEEP command is received, the signal is filtered, amplified, demodulated and sent to sweep electronics 22 where it is decoded for sweep initiation as previously described.

At the same time the sweep electronics 22 starts to transmit a sweep, it also sends a command to relay 74 to close movable contact arms 78, 78' of relay 74 against contacts 80, 80', thereby coupling the transmit portion of transceiver 34 to antenna 26. The transmit section includes 20 kHz oscillator 84, FM modulator 86, 100-milliwatt power amplifier 88 and output coupling transformer 90. The signal from strong motion detector 29 is sent to transceiver 34 over line 92, is converted to a frequency modulated VLF signal and is amplified by power amplifier 88 whose output signal is then coupled to antenna 26 through coupling transformer 90. Loop antenna 26 radiates the signal so that it is picked up by floating conductor 13 in cable 12, for reception by transceiver 30 in recording unit 10.

Antenna 26 is a directional loop antenna. Because the antenna is necessarily terminated, it draws power and hence it transmits signals by electromagnetic radiation rather than by a capacitive electrostatic field. A compact, self-contained loop antenna is necessary because of the mobility requirements of the seismic signal generator 18. A power amplifier 88 at the output of transceiver 34 is needed because of the restricted dimensions of antenna 26 as opposed to the relatively great length of the electrostatic radiator formed by floating conductor 13.

In a preferred embodiment, the loop antenna may be a wire coil wound around a ferrite core such as is described for use with a VLF receiver in U.S. Pat. No. 3,137,817 and illustrated in FIG. 2 thereof, the patent being assigned to the assignee of this application. Being highly directional, the ferrite core antenna may be pointed towards unterminated wire 13, thereby to more readily detect the weak electrostatic signals emanating therefrom.

From the above description, because of the inherently limited range of electrostatic radiation and the very low power output of the mobile-unit transceiver, it can be appreciated that interference with normal communication radio channels is not possible.

In the illustrative examples of FIGS. 3 and 4, relays 46 and 74 are shown as mechanical relays for simplicity. In actual practice, high speed, FET-type solid-state switches would be used because mechanical relays would be far too slow.

Another alternative is to use a low-power microwave system in place of the VLF system described above. A shielded coaxial lead would then be substituted for unterminated conductor 13. At each station a short ferrite stub antenna would be coupled to the coaxial cable and included within the multiconductor cable 12. To complete the system, loop antenna 26 on mobile buggy 18 would be replaced by a microwave antenna such as a horn or dipole depending upon the frequency. Microwave transceivers would be substituted for the VLF transceivers previously described. The reception range of microwave signals is limited to line-of-sight. Because the signal radiators or antennas in seismic cable 12 and on mobile buggy 18 are on or very close to the ground, the transmission range will perforce be strictly limited, thereby avoiding contamination of normal communication channels.

In view of the limited band width requirements for transmission of seismic signals, however, the VLF system is preferred as being more compatible and simpler because a special coaxial cable and dipole stub antennas are not required to be incorporated with the seismic cable. That is, in the VLF system, any spare wire in seismic cable 12 can be pressed into service as an antenna.

The only restriction on the center frequency of the VLF carrier is that it be separated from the useful seismic-frequency band by at least an order of magnitude. A center frequency of about 15 to 25 kHz is considered suitable.

The communications system disclosed herein should not be confused with the "phantom circuits" commonly use, for communications in conjunction with power lines. A phantom circuit requires use of two terminated conductors to provide two-way electromagnetic signal transmission between the mobile unit and the long power line. In this disclosure, the long-line, floating conductor 13, radiates signals electrostatically.

What is claimed is:

1. A limited-range radio communications system for transmitting command and data signals between a seismic recording apparatus and at least one mobile unit having a seismic signal generator mounted thereon, said mobile unit being positioned adjacent to a desired line of survey and remotely from said recording apparatus, the system comprising;
    an unterminated, electrically floating conductor positioned on the earth's surface substantially parallel to the line of survey, for electrostatically radiating radio signals;
    first transceiver means associated with said recording apparatus and coupled to said floating conductor for transmitting coded command signals to and receiving data signals from said floating conductor;
    second transceiver means mounted on said mobile unit and having an antenna coupled thereto for receiving command radio signals from and for electromagnetically transmitting data radio signals to said floating conductor.

2. The system defined by claim 1 wherein said first and second transceiver means are VLF transceivers operating in the very low frequency (VLF) band of the radio spectrum.

3. The system defined by claim 2 wherein said transceiver means includes means for transmitting and receiving said command and data radio signals on a frequency modulation basis.

4. The system defined by claim 2 wherein the length of said floating conductor is substantially one-quarter of the wavelength of the VLF radio signals.

5. The system as defined by claim 3 wherein the center frequency of the frequency modulated radio signals is within the range of 15–25 kilohertz.

6. The system as defined by claim 4 wherein:
    a plurality of seismic sensors are disposed at desired intervals along the line of survey for detecting seismic signals;
    a multiconductor cable interconnects said seismic sensors with said recording apparatus; and
    said floating conductor is included as one conductor of said multiconductor cable.

7. The system as defined by claim 6 wherein the seismic signal generator is a seismic sweep signal transducer having a base plate, the system further including:
    a first sweep signal electronics means coupled to said first transceiver and to said recording apparatus for generating and encoding a command signal and transferring said encoded command signal to said first transceiver means, and for sending a programmed sweep signal replica to said recording apparatus; and
    a second sweep signal electronics means, programmed identically to said first sweep signal electronics means, the second sweep signal electronics means being coupled to said second transceiver means and to said sweep signal transducer means, for receiving and decoding said command signal and in response thereto for driving said sweep signal transducer.

8. The system as defined by claim 7 and further including:
    means in said first transceiver means for switching said first transceiver from the transmit mode to the receive mode immediately after said coded command signal has been transmitted;
    means for coupling said first transceiver in the receive mode, to said recording apparatus;
    means in said second transceiver means for switching said second transceiver means from the receive to the transmit mode immediately following reception and decoding of said command signal;
    detector means having an output mounted on the base plate of said sweep signal transducer for converting the base plate motion to an electrical signal;
    means for coupling the output of said detector means to said second transceiver means in the transmit mode, whereby the electrical signal representing base plate motion is transmitted to said recording apparatus.

9. A limited-range radio communications system for transmitting command and data signals between a seismic recording apparatus and at least one mobile unit having a seismic signal generator mounted thereon, said mobile unit being positioned adjacent to a desired line of survey and remotely from said recording apparatus, the system comprising;
    an unterminated, electrically floating conductor positioned on the earth's surface substantially parallel to the line of survey, for electrostatically radiating radio signals;
    receiver means associated with said recording apparatus and coupled to said floating conductor for receiving data signals from said floating conductor.
    transmitter means mounted on said mobile unit and having an antenna coupled thereto for electromagnetically transmitting data radio signals to said floating conductor.

10. The system defined by claim 9 wherein said radio signals are in the very low frequency (VLF) band of the radio spectrum.

11. The system defined by claim 10 wherein said data radio signals are frequency modulated.

12. The system defined by claim 9 wherein the length of said floating conductor is substantially one-quarter of the wavelength of the VLF radio signals.

13. The system as defined by claim 11 wherein the center frequency of the frequency modulated radio signals is within the range of 15–25 kilohertz.

14. The system as defined by claim 9 wherein:
    a plurality of seismic sensors are disposed at desired intervals along the line of survey for detecting seismic signals;
    a multiconductor cable interconnects said seismic sensors with said recording apparatus; and
    said floating conductor is included as one conductor of said multiconductor cable.

15. A limited-range radio communications system for transmitting command and data signals between a seismic recording apparatus and at least one mobile unit having a seismic signal generator mounted thereon, said mobile unit being positioned adjacent to a desired line of survey and remotely from said recording apparatus, the system comprising;

an unterminated, electrically floating conductor positioned on the earth's surface substantially parallel to the line of survey, for electrostatically radiating radio signals;

transmitter means associated with said recording apparatus and coupled to said floating conductor for transmitting command signals to said floating conductor;

receiver means mounted on said mobile unit and having an antenna coupled thereto for receiving command radio signals from said floating conductor.

16. The system defined by claim 15 wherein said transmitter and receiver means are VLF apparatus operating in the very low frequency (VLF) band of the radio spectrum.

17. The system defined by claim 16 wherein said command radio signals are frequency modulated.

18. The system defined by claim 16 wherein the length of said floating conductor is substantially one-quarter of the wavelength of the VLF radio signals.

19. The system as defined by claim 17 wherein the center frequency of the frequency modulated radio signals is within the range of 15–25 kilohertz.

20. The system as defined by claim 18 and wherein:
a plurality of seismic sensors are disposed at desired intervals along the line of survey for detecting seismic signals;
a multiconductor cable interconnects said seismic sensors with said recording apparatus; and
said floating conductor is included as one conductor of said multiconductor cable.

21. The system as defined by claim 20 wherein the seismic signal generator is a seismic sweep signal transducer having a base plate, the system further including:
a first sweep signal electronics means coupled to said transmitter and to said recording apparatus for generating and encoding a command signal and transferring said coded command signal to said transmitter means, and for sending a programmed sweep signal replica to said recording apparatus; and a second sweep signal electronics means, programmed identically to said first sweep signal electronics means, the second sweep signal electronics means being coupled to said receiver means and to said sweep signal transducer means, for receiving and decoding said command signal and in response thereto for driving said sweep signal transducer.

22. A seismic system having a short range communications system comprising:
a seismic recording vehicle;
a seismic cable connected to said seismic recording vehicle and adapted to extend from said vehicle for distances of at least one or two miles along a line of survey;
means for detecting seismic signals connected to said seismic cable;
mobile vehicle means for applying seismic signals into the earth at a plurality of successive stations adjacent said seismic cable along said line of survey;
elongated antenna means embedded in said seismic cable and extending from said recording vehicle for most of the length of said seismic cable;
first transceiver means in said recording vehicle for transmitting and receiving signals over said elongated antenna means; and
second low power, short range transceiver means in said mobile vehicle means for receiving signals from and transmitting signals to said elongated antenna means.

23. A seismic system as set forth in claim 22 further comprising:
means at said recording vehicle for transmitting control signals through said transceivers to said mobile vehicle means to initiate the application of seismic signals into the earth, and to start a seismic recording cycle.

24. A seismic system as defined in claim 23 further including means, at said mobile vehicle means, for transmitting to said recording vehicle, over said transceivers, a reference signal, said reference signal being a replica of the seismic signal as actually applied to the earth.

25. A seismic system as defined in claim 22 wherein said transceivers are VLF transceivers.

26. The system as defined in claim 14 wherein said seismic signal generator includes a means for applying seismic signals to the earth and said data signal is a representation of the seismic signals actually applied.

* * * * *